(12) United States Patent
Carroll et al.

(10) Patent No.: US 7,549,839 B2
(45) Date of Patent: Jun. 23, 2009

(54) VARIABLE GEOMETRY INLET GUIDE VANE

(75) Inventors: Christian A. Carroll, Haddam, CT (US); James Allen Eley, Middletown, CT (US); Carl Brian Klinetob, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 56 days.

(21) Appl. No.: 11/258,608

(22) Filed: Oct. 25, 2005

(65) Prior Publication Data

US 2007/0092372 A1    Apr. 26, 2007

(51) Int. Cl.
*F01D 17/12* (2006.01)
(52) U.S. Cl. ..................... 415/161; 415/914
(58) Field of Classification Search ............ 415/151, 415/159, 160, 161, 191, 914
See application file for complete search history.

(56) References Cited

U.S. PATENT DOCUMENTS

| | | | | |
|---|---|---|---|---|
| 2,396,811 A | * | 3/1946 | Bathras | 416/235 |
| 3,442,493 A | * | 5/1969 | Smith, Jr. | 415/164 |
| 4,542,868 A | * | 9/1985 | Boyd | 244/198 |
| 4,618,313 A | * | 10/1986 | Mosiewicz | 416/237 |
| 4,856,962 A | * | 8/1989 | McDow | 415/115 |
| 5,492,448 A | * | 2/1996 | Perry et al. | 416/62 |
| 6,045,325 A | * | 4/2000 | Horvath et al. | 415/161 |
| 6,179,559 B1 | * | 1/2001 | Weaver | 415/161 |
| 6,619,916 B1 | * | 9/2003 | Capozzi et al. | 415/160 |
| 7,055,304 B2 | * | 6/2006 | Courtot et al. | 60/39.093 |

* cited by examiner

*Primary Examiner*—Edward Look
*Assistant Examiner*—Nathaniel Wiehe
(74) *Attorney, Agent, or Firm*—Carlson, Gaskey & Olds

(57) ABSTRACT

An inlet guide vane provides improved, smooth airflow and avoids separation of flow even at high incidence angles. The inlet guide vane includes a strut having opposite side surfaces that are continuously curved to provide a controlled velocity distribution at the trailing edge of the strut. The inlet guide vane further includes a flap having a leading edge aligned behind the trailing edge of the strut. Generally, the strut and the flap are designed together so that low momentum air in the gap between the strut and the flap will be energized and entrained in the boundary layer of the flap. The airflow from the gap will remain attached to the flap to improve the flow from the flap.

31 Claims, 5 Drawing Sheets

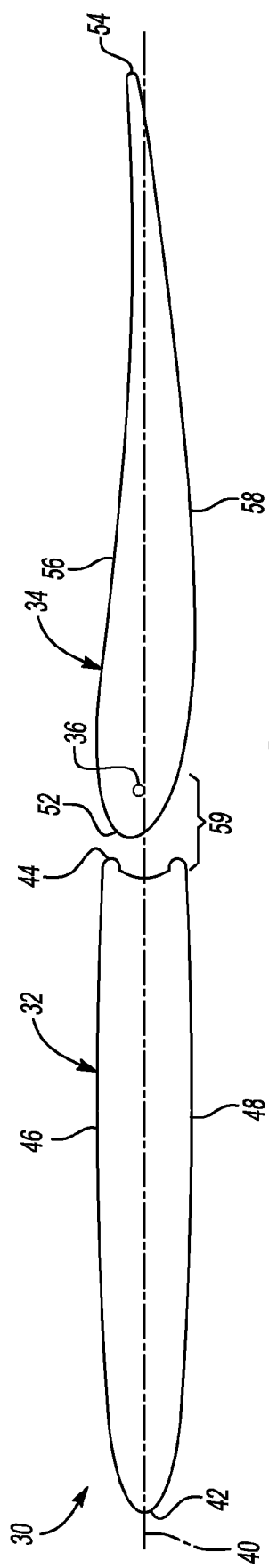
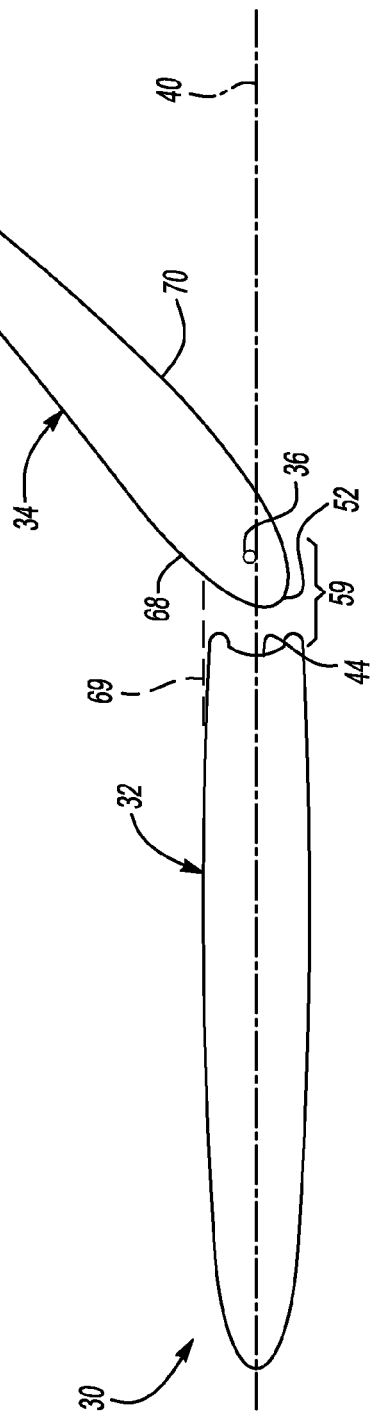

Fig-4
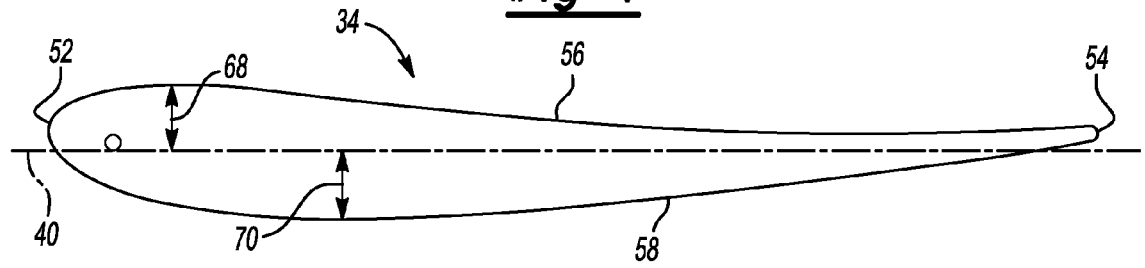
Fig-5
10%
30%
50%
70%
90%
Fig-6

VARIABLE GEOMETRY INLET GUIDE VANE

This invention was made with government support under contract number N00019-02-C3003 awarded by the United States Navy. The government has certain rights in this invention.

BACKGROUND OF THE INVENTION

The present invention relates generally to turbine engines and more particularly to a variable geometry inlet guide vane.

Some gas turbine engines, particularly gas turbine engines for military aircraft, include variable geometry inlet guide vanes positioned in front of the compressor inlet or in front of the fan. The inlet guide vanes each include a fixed strut having a leading edge and a trailing edge. A flap is positioned with its leading edge behind the trailing edge of the strut. The flap is pivotable about an axis near its leading edge such that the flap is pivotable from a zero deflection position to a fully deflected position. In the zero deflection position, the leading edge and trailing edge of the flap are substantially aligned with and masked behind the leading edge and the trailing edge of the strut. In the fully deflected position, the flap extends at an angle (e.g. 45°) relative to the strut, with the leading edge of the flap adjacent the trailing edge of the strut and the trailing edge of the flap is deflected substantially into the airflow, such that a side surface of the flap deflects airflow into the engine.

Generally, the zero deflection position is used during high speeds, while the fully deflected position is used during engine start up. Thus, many prior designs have been optimized only for the zero deflection position without much consideration of the inlet guide vane in the deflected position. As a result, the known inlet guide vanes may cause separation of the air flow from the flap, which results in a turbulent and even pulsating flow into the engine. This increases wear on the components downstream of the inlet guide vane. In part, some of the problems in the known inlet guide vanes occur because of the gap between the trailing edge of the strut and the leading edge of the flap. Air flowing into the gap loses momentum and then flows out unevenly, disrupting the air flow on the surface of the flap.

Sometimes it is desirable to have an exit turning angle that is positive at the outer end and negative at the inner end of the flap at the zero deflection position. This exit angle is in the form of some prescribed inlet angle distribution along the span of a downstream airfoil. Some known flaps have a camber that varies along its span, such that the camber of the flap switches from negative (at the inner end) to positive (at the outer end). This type of flap may have trouble when the flap is deflected to a closed position, where the outer end has positive camber in the direction of flap deflection while the inner end has negative camber opposite to the direction of flap deflection. This can lead to high losses and flow separations.

SUMMARY OF THE INVENTION

The present invention provides an inlet guide vane that avoids separation of flow even at high incidence angles. Generally, the strut and the flap are designed together so that low momentum air in the gap between the strut and the flap will be energized and entrained in the boundary layer of the flap. The airflow from the gap will remain attached to the flap to improve the flow from the flap.

In one embodiment, the strut has opposite side surfaces that are continuously curved to provide a controlled velocity distribution at the trailing edge of the strut. The flap has a leading edge aligned behind the trailing edge of the strut. The flap includes a pressure side surface having a peak spaced away from the leading edge. A suction side surface of the flap has a peak spaced further away from the leading edge than the peak on the pressure side surface, to provide a more gradual acceleration of the airflow.

These and other features of the present invention can be best understood from the following specification and drawings, the following of which is a brief description.

BRIEF DESCRIPTION OF THE DRAWINGS

FIG. 2 is a section taken along lines 2-2 of FIG. 1.

FIG. 3 is a view similar to FIG. 2 with the flap in the fully deflected position.

FIG. 4 is an enlarged view of the strut in FIG. 2.

FIG. 5 is an enlarged view of the flap of FIG. 2.

FIG. 6 is a series of radially-spaced section views of a second embodiment of the inlet guide vane.

DETAILED DESCRIPTION OF THE PREFERRED EMBODIMENT

Figure 1:
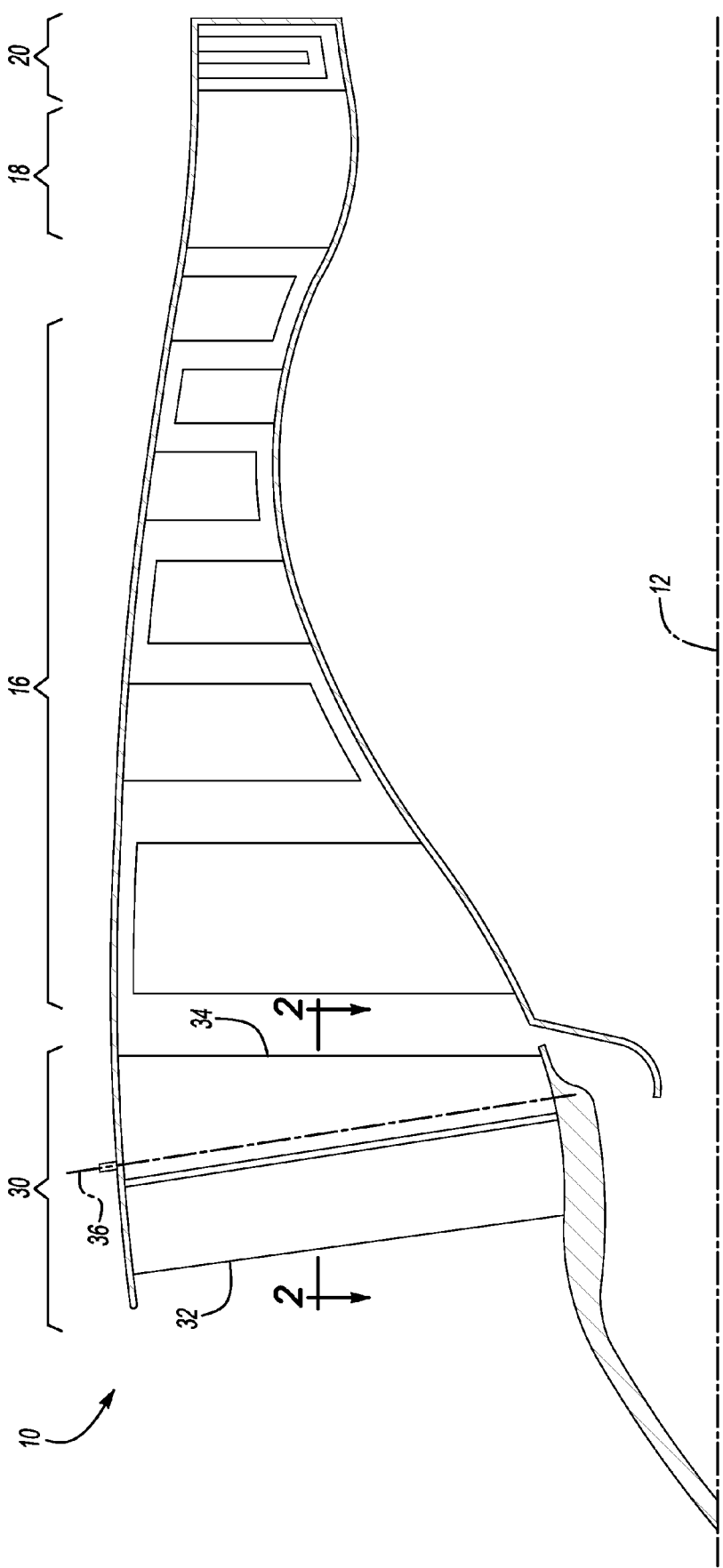
FIG. 1 is a sectional view of one example turbine engine in which the inlet guide vane of the present invention can be used.

FIG. 1 shows a gas turbine engine 10 circumferentially disposed about an engine centerline or axial centerline axis 12. The engine 10 includes a compressor 16, a combustion section 18 and a turbine 20. As is well known, air compressed in the compressor 16 is mixed with fuel that is burned in the combustion section 18 and expands in the turbine 20. The turbine 20 rotates in response to the expansion driving the compressor 16.

A plurality of inlet guide vanes 30 (one shown) are disposed about the centerline axis 12 in front of the compressor 16. Each in the inlet guide vanes 30 includes a strut 32 (a fixed airfoil) and a flap 34 (variable incidence airfoil). The flap 34 is pivotable about an axis 36 near the strut 32. Although the inlet guide vane 30 of the present invention is shown and used with a particular type of gas turbine engine 10, the invention is not so limited, and can be used with any known gas turbine engine type.

FIG. 2 is section view taken along line 2-2 of FIG. 1 through the inlet guide vane 30 when the inlet guide vane 30 is in the zero deflection position. The inlet guide vane 30 has a centerline 40, which in this particular embodiment evenly divides a symmetrical strut 32. However, in particular applications, the strut 32 may not be symmetrical. The strut 32 includes a leading edge 42 and a trailing edge 44. Opposite side surfaces 46, 48 extend from the leading edge 42 to the trailing edge 44. The side surfaces 46, 48 each have continuous curvature from the leading edge 42 to the trailing edge 44 giving the strut 32 what is generally an airfoil shape, or more particularly, an airfoil shape having a truncated trailing edge 44.

As shown in the example embodiment, the flap 34 need not be symmetrical about the centerline 40 at all. The flap 34 includes a leading edge 52 and a trailing edge 54 which as shown in this embodiment may both be located on the same side of the centerline 40 in the zero deflection position. The flap 34 includes a pressure side surface 56 and a suction side surface 58 between the leading edge 52 and the trailing edge 54. The pivot axis 36 of the flap 34 may or may not be located on the centerline 40. In this particular embodiment, the pivot axis 36 is closer to the pressure side surface 56 of the flap 34 (i.e. the direction toward which the flap 34 can pivot); however, the particular location will depend upon each particular application. The leading edge 52 of the flap 34 is separated from the trailing edge 44 of the strut 32 by a gap 59.

The inlet guide vane 30 is shown with the flap 34 pivoted to the fully deflected position in FIG. 3. As shown, the leading edge 52 of the flap remains masked behind the trailing edge 44 of the strut 32 while the side surface 56 and trailing edge 54 of the flap 34 project into the air flow to control and deflect the air flow.

Enlarged views of the strut 32 and the flap 34 are shown in FIGS. 4 and 5, respectively. Details of the strut 32 and flap 34 will be described in more detail with respect to those figures; however, any of the particular details are specific to a particular application, and it is the general design principles set forth herein that are primarily the subject of this invention, although the specific details of these designs maybe independently patentable as well.

Referring to FIG. 4, the side surfaces 46, 48 each have continuous curvature from the leading edge 42 to the trailing edge 44 giving the strut 32 what is generally an airfoil shape, or more particularly in this example, an airfoil shape having a truncated trailing edge 44. The side surfaces 46, 48 curve outwardly from the leading edge 42 to a maximum thickness of the strut 32 generally at a midpoint and then taper in a curve convexly inwardly as they extend to the trailing edge 44. The trailing edge 44 optionally includes a pair of protrusions or ridges 60 protruding aft from the trailing edge 44, defining a recess 62 between the ridges 60. The ridges 60 assist in minimizing the energy of the flow passing through the gap 59. By slowing the flow through the gap 59, the flow exiting the gap 59 can more easily be entrained with the boundary layer on the flap 34.

In general, the strut 32 is designed to control the velocity distribution of the airflow at the trailing edge 44. It is optimized for incidence range, low drag, soft stall and a long favorable pressure gradient. The tapered aft section of the strut 32 provides a controlled recovery region just upstream of the gap 59 (FIGS. 2-3). The thickness, camber and location of the truncation of the strut 32 are determined such that the pressure distribution will be optimized for the flap 34 (FIGS. 2-3). The trailing edge thickness of the strut 32 is determined such that it will mask the leading edge 52 of the flap 34 (FIGS. 2-3) throughout its incidence range.

FIG. 5 illustrates the flap 34 in more detail. The pressure side surface 56 and the suction side surface 58 extend from the leading edge 52 to the trailing edge 54. The pressure side surface 56 includes a peak thickness 68 relative to the centerline 40 that is spaced aft of the leading edge 52. The suction side surface 58 includes a peak thickness 70 relative to the centerline 40 that is spaced aft of the leading edge 52 and aft of the peak thickness 68 of the pressure side surface 56. Again, the exact shape will depend upon the specific application, but in the example design, the peak thickness 70 is substantially aft of the peak thickness 68, and preferably more than twice as far from the leading edge 52.

The pressure side surface 56 curves convexly outwardly to the peak thickness 68, then curves convexly inwardly to an approximate midpoint and then curves concavely outwardly to the trailing edge 54. The suction side surface 58 curves convexly outwardly from the leading edge 52 across centerline 40 to the peak thickness 70 and then convexly inwardly to the trailing edge 54 across the centerline 40, although there is minimal curve on the suction side surface 58 in the last third of the length of the flap 34.

The leading edge 52 of the flap 34 is designed such that it remains masked behind the profile of the strut 32 (FIG. 4) throughout its incidence range. This minimizes the pressure differential between the accelerated flow on the pressure side of the gap 59 (FIGS. 2-3) and the lower speed flow on the suction side of the gap 59.

In operation, referring to FIG. 2, the continuous curvature of the side surfaces 46, 48 of the strut 32 and the controlled deceleration of the flow at the tapered rearward portion provide a controlled velocity distribution of the flow to the leading edge 52 of the flap 34. In the zero deflection position shown in FIG. 2, the airflow flows from the trailing edge 44 of the strut 32 to the leading edge 52 of the flap 34 and along the side surfaces 56, 58 of the flap 34.

In the fully deflected position, shown in FIG. 3, the peak thickness 68 of the pressure side surface 56 of the flap 34 is near the trailing edge 44 of the strut 32. However, the peak thickness 68 is also aft of a point on the pressure side surface 56 at the intersection of an extension 69 of side surface 46 of the strut 32 and the pressure side surface 56 of the flap 34. On the pressure side, the airflow flows from the trailing edge 44 of the strut 32, across the gap 59 and then accelerates along the pressure side surface 56 of the flap 34 to the peak thickness 68, thereby drawing any low momentum air out of the gap 59. On the suction side, the airflow from the trailing edge 44 of the strut 32 flows across the gap 59, decelerates as it turns along the flap 34 and then accelerates at a moderate rate over the long continuous convex curvature of the suction side surface 58. Because the peak thicknesses 68, 70 are far enough downstream of the gap 59, the leaked flow from the gap 59 will be accelerated and entrained in the boundary layer of the flap 34. The camber of the flap 34 is designed to provide a velocity distribution at all desired incidences that will energize the flow through the gap 59 and remain attached to the flap 34 and deliver the desired exit air angle. The thickness of the flap 34 is determined by the passage requirements and can be thicker or thinner than the strut 32 as needed.

FIG. 6 is a series of section views through an inlet guide vane 130 according to a second embodiment of the present invention. The section views are radially spaced from one another along the span of the inlet guide vane 130 at a nominal zero deflection position. The 10% section view is taken at a point 10% of the inlet guide vane's span from a radially inner edge of the inlet guide vane. The 30% section view is taken at a point 30% of the span from the inner edge, and so on.

As explained above the Background, sometimes it is desirable to have an exit turning angle that is both negative (at the inner end) and positive (at the outer end) on the same flap at the zero deflection position. The flap 134 in FIG. 6 is a "reflexed airfoil," which gives a negative air angle for a positively cambered flap 134. This is done by introducing a bi-camber on the flap 134 section (along the chord) instead of along the span. The camber of the flap 134 starts in one direction and then reverses towards the trailing edge 154. The amount of bi-camber is balanced with flap sectional incidence, allowing the desired amount of negative camber at the trailing edge 154 to be "dialed" in. Therefore the overall camber stays the same for all flap 134 sections down the span.

This improves flow attachment at high deflection angles. The flap 134 allows the inner end sections to be designed for balanced and optimized performance at both the zero deflection and full deflection positions. The reason this is possible is that when the flap 134 is in the zero deflection position, the last 40 or 50% of the flap 134 section is the biggest player (in minimizing drag), while when in the fully deflected position, the first 50 or 60% of the flap 134 section is the most critical to the success of the airfoil delivering the desired performance (minimal or no separation). Therefore the flap 134 has a trailing edge 154 with a good high speed camber for low loss but at the same time has good low speed high turning camber in the opposite direction for when the flap 134 is deflected. All of the design techniques described above with respect to FIGS. 1-5 are applicable to this embodiment as well.

Figure 7:
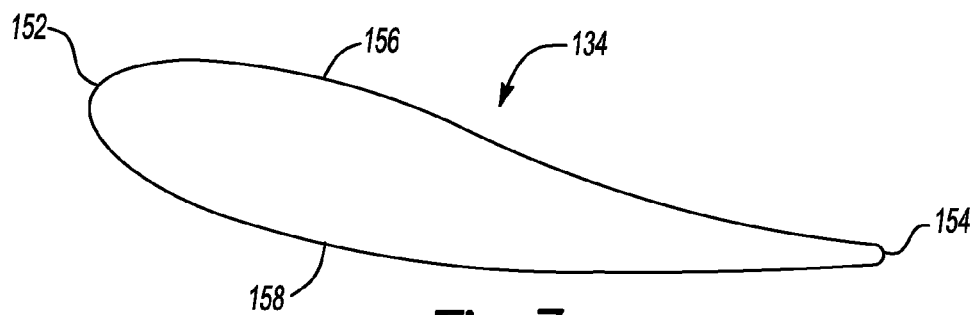
FIG. 7 illustrates an enlarged view of the flap at 10% section view of FIG. 6.

An enlarged view of the 10% section view of the flap 134 of FIG. 6 is shown in FIG. 7. The pressure side surface 156 curves convexly away from the leading edge 152 and then very gradually starts to turn concavely to the trailing edge 154 in the last third of the flap 134. The suction side surface 158 curves convexly from the leading edge 152 and then slightly concavely to the trailing edge 154.

Figure 8:
FIG. 8 illustrates a second alternate flap.

An optional feature is illustrated in FIG. 8 that can be applied to any of the flaps described herein. On the flap 234 shown in FIG. 8, a trailing edge tab 275 protrudes normally from the pressure side surface 256 along the extreme trailing edge 254. Although the actual dimensions of the trailing edge tab 275 will depend upon the camber, incidence range and chord of the flap 234, the size of the trailing edge tab 275 is exaggerated in FIG. 8 for purposes of illustration. The trailing edge tab 275 assists in the continued attachment of flow when extremely high incidence is required.

Figure 8A:
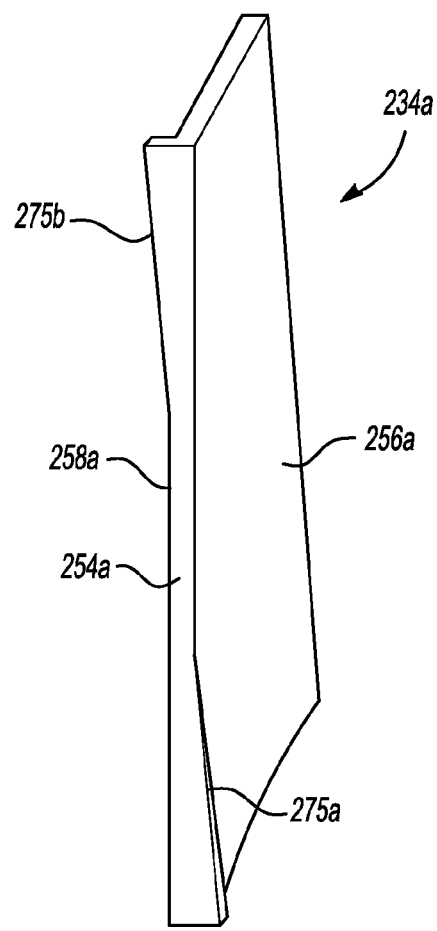
FIG. 8A schematically illustrates a variation of the second alternate flap, from a trailing edge perspective view.

More generally, the trailing edge tab 275 is on the side of maximum incidence change. Thus, in a bi-cambered flap 234a as shown in FIG. 8A, the trailing edge tab 275a may protrude from a pressure side surface 256a near the trailing edge 254a at an inner portion of the flap 234a, gradually disappear in the center of the flap 234a and gradually reappear on the suction side surface 258a of the flap 234a at a radially outer portion of the flap 234a.

Figure 9:
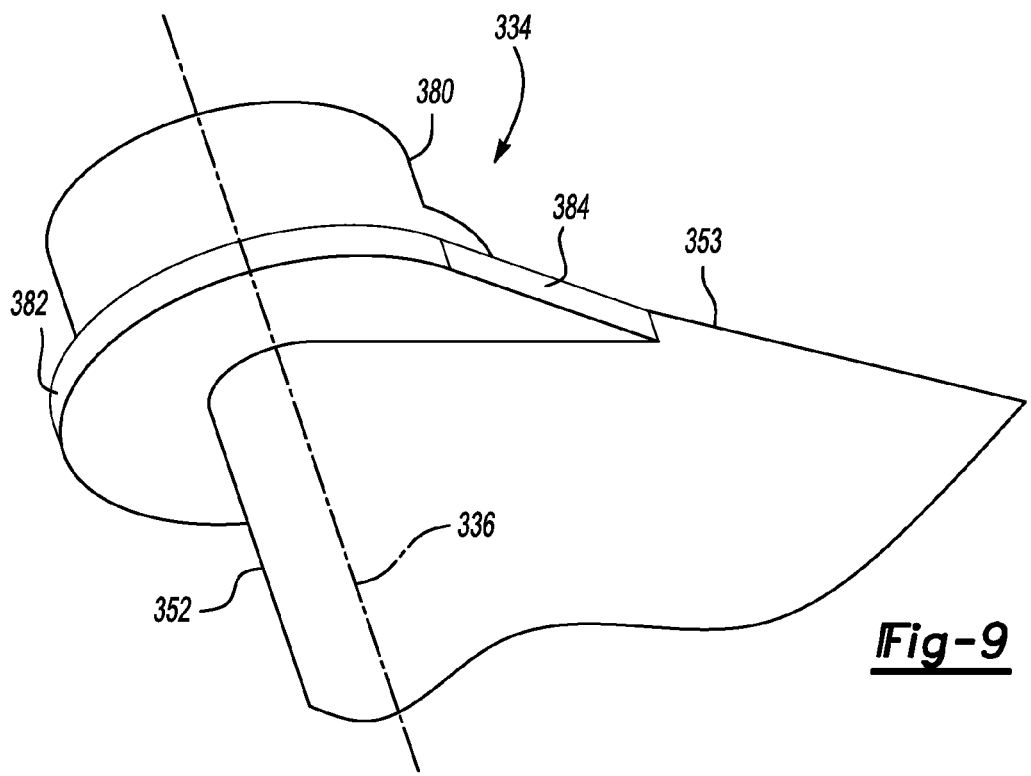
FIG. 9 is a perspective view of the upper leading edge of a third alternate flap.

Another optional feature that can be applied to any of the embodiments described herein is illustrated in FIG. 9. A flap 334 is pivotable about a pivot axis 336. An OD hinge pivot 380 at the leading edge 352 and upper edge 353 of the flap 334 includes a low profile streamlined disk 382 having a tapered rearward portion 384. The OD hinge pivot 380 shown in FIG. 9 provides structural rigidity while reducing the amount of blockage introduced as compared with the previous designs where an upper portion of the leading edge angled forwardly in order to reinforce the hinge pivot.

Figure 10:
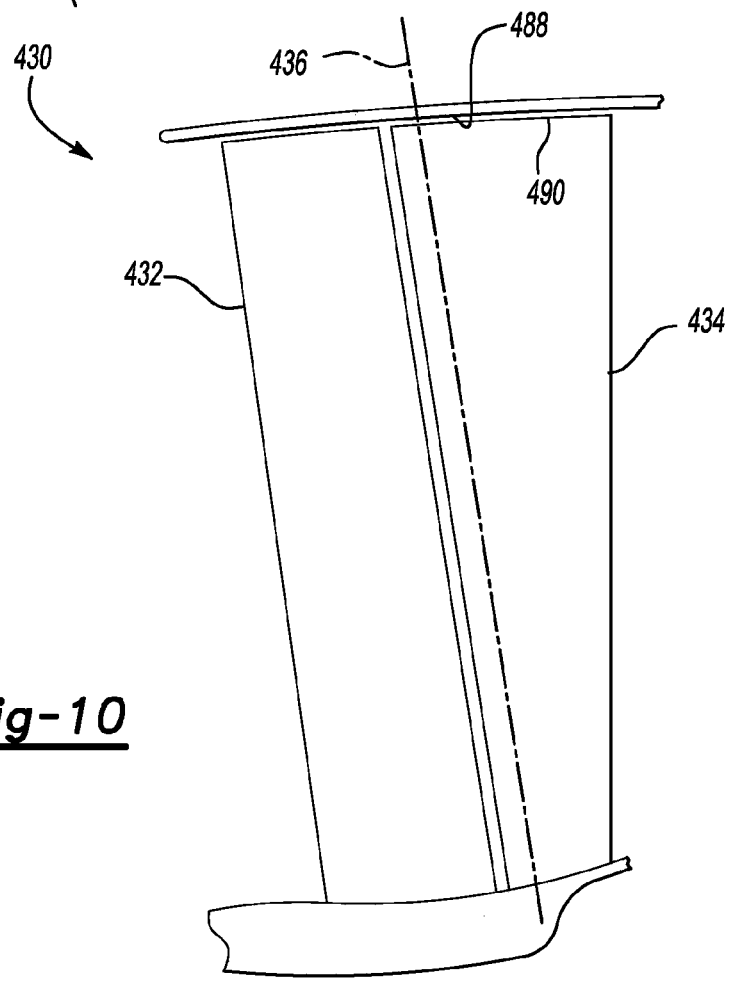
FIG. 10 illustrates an inlet guide vane according to the present invention with an optional upper edge/end wall junction that could be used in any of the embodiments of this application.

FIG. 10 illustrates another optional feature that could be used with any of the flaps disclosed herein. An inlet guide vane 430 includes a strut 432 and a flap 434 that is pivotable about a pivot axis 436. An upper edge 488 of the flap 434 is curved convexly in a manner complementary to a spherical inner surface 490 of the end wall. The spherical inner surface 490 is defined by a hypothetical sphere having a center point at the intersection of the pivot axis 436 and the engine centerline axis 12 (FIG. 1). The curve of the upper edge 488 of the flap 434 is also defined about the center point of the sphere. As a result, the gap between the upper edge 488 of the flap 434 and the spherical inner surface 490 remains constant throughout the full incidence range of the flap 434.

Although preferred embodiments of this invention have been disclosed, a worker of ordinary skill in this art would recognize that certain modifications would come within the scope of this invention. For that reason, the following claims should be studied to determine the true scope and content of this invention.

What is claimed is:

1. An inlet guide vane comprising:
    a fixed airfoil having a leading edge and a trailing edge; and
    a variable incidence airfoil having a leading edge spaced aft of the trailing edge of the fixed airfoil by a gap, the variable incidence airfoil being pivotable about an axis near the leading edge of the variable incidence airfoil, wherein the leading edge of the variable incidence airfoil remains masked behind the trailing edge of the fixed airfoil throughout a full variable range of incidence of the variable incidence airfoil and wherein the variable incidence airfoil is completely masked behind the trailing edge of the fixed airfoil on a suction side when the variable incidence airfoil is in a fully deflected position and when the variable incidence airfoil is in a zero deflected position,
    wherein the variable incidence airfoil and the fixed airfoil are shaped and positioned in order to energize low momentum flow in the gap and entrain the flow from the gap in a boundary layer of the variable incidence airfoil during operation, wherein the boundary layer of the variable incidence airfoil is on a pressure side surface of the variable incidence airfoil.

2. The inlet guide vane of claim 1 wherein the trailing edge of the fixed airfoil is truncated.

3. The inlet guide vane of claim 2 wherein the trailing edge of the fixed airfoil includes at least one aft-facing recess.

4. The inlet guide vane of claim 1 wherein the fixed airfoil has a pair of side surfaces between the leading edge and the trailing edge, the side surfaces each having continuous curvature from the leading edge to the trailing edge.

5. The inlet guide vane of claim 1 wherein the fixed airfoil is shaped to control a velocity distribution of airflow at the trailing edge.

6. The inlet guide vane of claim 1 wherein the variable incidence airfoil has a first side surface and a second side surface between the leading edge and the trailing edge, the first side surface having a first peak spaced aft of the leading edge by a first distance, the second side surface having a second peak spaced aft of the leading edge by a second distance greater than the first distance.

7. The inlet guide vane of claim 6 wherein the variable incidence airfoil is pivotable in the direction of the first side surface about the axis to a maximum incidence angle and wherein the first peak is spaced aft of a point on the first surface that lies on a tangent to the trailing edge of the fixed airfoil when the variable incidence airfoil is pivoted to the maximum incidence angle.

8. The inlet guide vane of claim 1 wherein the leading edge of the variable incidence airfoil extends from an inner edge to an outer edge and wherein a distance between the leading edge and the trailing edge of the variable incidence airfoil is higher at the outer edge than at the inner edge.

9. The inlet guide vane of claim 8 wherein the distance between the leading edge and the trailing edge of the variable incidence airfoil increases continuously from the inner edge to the outer edge.

10. The inlet guide vane of claim 8 wherein a camber of the variable incidence airfoil increases from the inner edge to the outer edge.

11. The inlet guide vane of claim 1 wherein the trailing edge of the variable incidence airfoil is not parallel to the axis.

12. The inlet guide vane of claim 1 wherein the leading edge and the trailing edge of the variable incidence airfoil extend between an inner edge and an outer edge, the outer edge is curved convexly between the leading edge and the trailing edge.

13. The inlet guide vane of claim 12 further including a housing having an inner surface having a spherical portion, wherein the outer edge of the variable incidence airfoil is adjacent the spherical portion of the inner surface of the housing.

14. The inlet guide vane of claim 1 wherein the leading edge and the trailing edge of the variable incidence airfoil extend between an inner edge and an outer edge, an uppermost portion of the leading edge of the variable incidence airfoil is straight, the variable incidence airfoil including a flange on a forward portion of the outer edge, the flange protruding forwardly past the leading edge of the variable incidence airfoil and having a tapered rearward portion.

15. The inlet guide vane of claim 1 wherein the full variable range of incidence of the variable incidence airfoil extends from the zero deflection position to the fully deflected position.

16. An inlet guide vane comprising:
a fixed airfoil having a leading edge and a trailing edge; and
a variable incidence airfoil having a leading edge aft of the trailing edge of the fixed airfoil, the variable incidence airfoil being pivotable about an axis near the leading edge of the variable incidence airfoil, the variable incidence airfoil including a trailing edge tab protruding from a first side surface thereof near the trailing edge, wherein the trailing edge of the variable incidence airfoil extends from an inner edge to an outer edge and wherein the trailing edge tab protrudes from the first side surface proximate one of the inner edge and the outer edge, but not the other of the inner edge and the outer edge.

17. The inlet guide vane of claim 16 wherein the trailing edge tab protrudes from the first side surface proximate the inner edge, but not the outer edge.

18. The inlet guide vane of claim 17 wherein the trailing edge tab is a first trailing edge tab, further including a second trailing edge tab protruding from a second side surface proximate the outer edge, but not the inner edge, the second side surface opposite the first side surface.

19. The inlet guide vane of claim 16 wherein the trailing edge tab protrudes from the first side surface proximate the outer edge, but not the inner edge.

20. A method for designing an inlet guide vane including the steps of:
a) determining a shape of a strut in order to control a velocity distribution at a trailing edge of the strut;
b) determining a position of a flap to have a leading edge adjacent the trailing edge of the strut and spaced from the trailing edge of the strut by a gap, the flap having a selectively variable incidence relative to the strut; and
c) determining a shape of the flap based upon the shape of the strut and the position of the flap in order to energize low momentum flow in the gap and entrain the flow from the gap in a boundary layer on a pressure side of the flap during operation, said step c) including the step of determining the shape of the flap such that the leading edge of the flap remains masked behind the trailing edge of the strut throughout a full variable range of incidence of the flap and wherein the flap is completely masked behind the trailing edge of the strut on a suction side when the flap is in the fully deflected position.

21. The method of claim 20 further including the step of:
d) determining a pivot axis for the flap to pivot relative to the strut.

22. The method of claim 21 wherein said steps c) and d) further include the step of determining the shape of the flap and the pivot axis such that the leading edge of the flap is masked behind the trailing edge of the strut through a full range of the variable incidence of the flap.

23. The method of claim 20 wherein the shape of the strut determined in said step a) includes side surfaces each having continuous curvature from a leading edge to the trailing edge of the strut.

24. An inlet guide vane comprising:
a fixed airfoil having a leading edge and a trailing edge, the fixed airfoil defining a centerline through the inlet guide vane; and
a flap having a leading edge, a trailing edge, a pressure side surface and a suction side surface, the pressure side surface extending from the leading edge to the trailing edge, the leading edge and the trailing edge of the flap both positioned on the same side of the centerline when the inlet guide vane is in a zero deflection position, the pressure side surface having a peak spaced aft of the leading edge by a first distance, the suction side surface extending from the leading edge to the trailing edge, the suction side surface having a peak spaced aft of the leading edge by a second distance greater than the first distance, the leading edge of the flap adjacent the trailing edge of the fixed airfoil, the flap being pivotable about an axis on the pressure side of the centerline.

25. The inlet guide vane of claim 24 wherein the flap includes a trailing edge tab protruding normally from the pressure side surface near the trailing edge.

26. The inlet guide vane of claim 24 further including an upper edge extending from the leading edge to the trailing edge, wherein the upper edge is curved convexly.

27. The inlet guide vane of claim 26 wherein the pivot axis intersects a centerpoint spaced away from the flap, and wherein the centerpoint is the centerpoint of the curve of the upper edge of the flap.

28. The inlet guide vane of claim 24 wherein the fixed airfoil has a pair of continuously curved side surfaces.

29. The inlet guide vane of claim 24 disposed upstream of a compressor of a turbine engine.

30. An inlet guide vane comprising:
a fixed airfoil having a leading edge, a trailing edge and a centerline extending through a center of the fixed airfoil; and
a variable incidence airfoil having a leading edge aft of the trailing edge of the fixed airfoil, the variable incidence airfoil being pivotable about an axis near the leading edge of the variable incidence airfoil, wherein the leading edge of the variable incidence airfoil remains masked behind the trailing edge of the fixed airfoil throughout a full variable range of incidence of the variable incidence airfoil and wherein the variable incidence airfoil is completely masked behind the trailing edge of the fixed airfoil on a suction side when the variable incidence airfoil is in a fully deflected position and when the variable incidence airfoil is in a zero deflected position, wherein the leading edge and the trailing edge of the variable incidence airfoil are both on the same side of the centerline when the inlet guide vane is in a zero deflection position.

31. The inlet guide vane of claim 30 wherein the variable incidence airfoil has a first side surface and a second side surface between the leading edge and the trailing edge, the first side surface having a first peak spaced aft of the leading edge by a first distance, the second side surface having a second peak spaced aft of the leading edge by a second distance greater than the first distance.

* * * * *